United States Patent
Akashi

(10) Patent No.: US 8,264,744 B2
(45) Date of Patent: Sep. 11, 2012

(54) IMAGE PROCESSING APPARATUS, IMAGE PROCESSING METHOD, AND PROGRAM TO EXECUTE IMAGE PROCESSING METHOD

(75) Inventor: Masamichi Akashi, Funabashi (JP)

(73) Assignee: Canon Kabushiki Kaisha, Tokyo (JP)

( * ) Notice: Subject to any disclaimer, the term of this patent is extended or adjusted under 35 U.S.C. 154(b) by 713 days.

(21) Appl. No.: 12/433,900

(22) Filed: May 1, 2009

(65) Prior Publication Data

US 2009/0284769 A1 Nov. 19, 2009

(30) Foreign Application Priority Data

May 15, 2008 (JP) ................................. 2008-128790

(51) Int. Cl.
G06F 3/12 (2006.01)
(52) U.S. Cl. .......... 358/1.9; 358/2.1; 358/1.13; 382/190
(58) Field of Classification Search ................... 358/1.1, 358/1.9, 1.12–1.16, 2.1, 3.06, 448, 452, 462; 382/176, 190, 227; 715/255
See application file for complete search history.

(56) References Cited

U.S. PATENT DOCUMENTS

| | | | |
|---|---|---|---|
| 6,519,053 B1 * | 2/2003 | Motamed et al. | 358/1.16 |
| 2003/0098993 A1 * | 5/2003 | Ohara | 358/1.15 |
| 2004/0109181 A1 * | 6/2004 | Suzuki | 358/1.9 |
| 2005/0111053 A1 | 5/2005 | Yoshida et al. | 358/448 |
| 2006/0221360 A1 * | 10/2006 | Yoshida | 358/1.1 |
| 2007/0279670 A1 * | 12/2007 | Hiruma | 358/1.14 |
| 2008/0170786 A1 * | 7/2008 | Tomizawa et al. | 382/176 |
| 2010/0100813 A1 * | 4/2010 | Saito et al. | 715/255 |
| 2011/0069352 A1 * | 3/2011 | Yaguchi et al. | 358/1.16 |

FOREIGN PATENT DOCUMENTS

| | | |
|---|---|---|
| JP | 2001-253125 | 9/2001 |
| JP | 2005-159517 | 6/2005 |

* cited by examiner

*Primary Examiner* — Kimberly A Williams

(74) *Attorney, Agent, or Firm* — Fitzpatrick, Cella, Harper & Scinto

(57) ABSTRACT

An instruction of image processing for an image and an object included in the image is received from a client. The operation environment of the client is stored as the metadata of the object included in the image. When an instruction is input to re-evaluate the attribute of the object included in the image, a record is made as metadata indicating that the attribute has been re-evaluated. Upon receiving another image different from the image, when the operation environment of a client which has given an instruction to perform image processing of the other image is identical to the operation environment of the client which is stored by the storage unit, and the record is in the recording unit indicating that the attribute has been re-evaluated, the attribute of the received other image is re-evaluated.

20 Claims, 17 Drawing Sheets

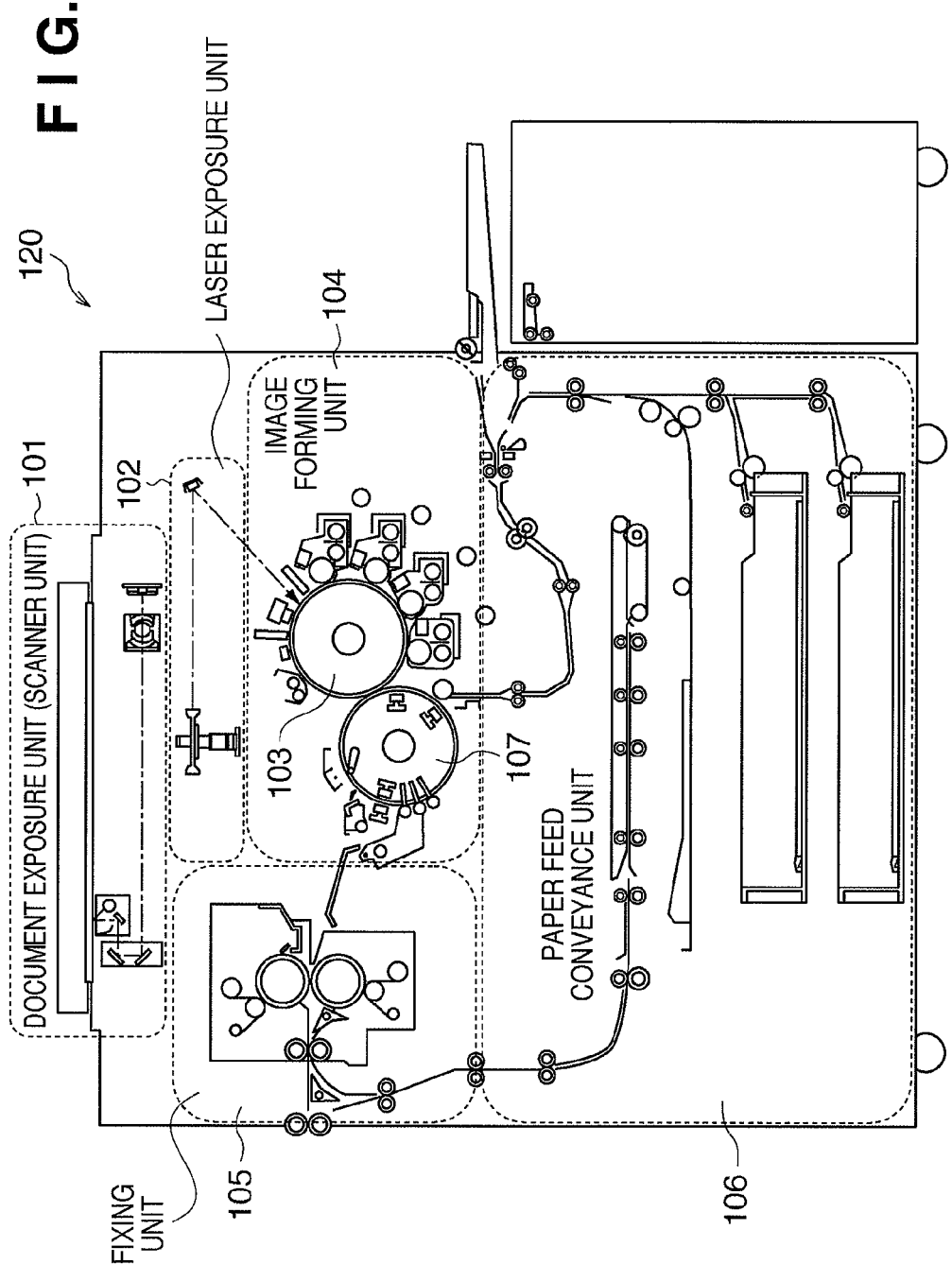

[COMMON-IN-DEVICE METADATA]
<DEVICE>
<DEVICE NAME>MFPI</DEVICE NAME>
<ATTRIBUTE CORRECTION INFORMATION>
  <ENVIRONMENT>
    <APPLICATION>Illustrator
      <VERSION>12.0.1</VERSION>
    </APPLICATION>
    <OS>MacOSX
      <VERSION>10.4.8</VERSION>
    </OS>
    <PDL>PostScript
      <VERSION>3</VERSION>
    </PDL>
  </ENVIRONMENT>
  <OBJECT>
    IMAGE→TEXT
    <CORRECTION COUNT>
      1
    </CORRECTION COUNT>
  </OBJECT> <OBJECT>
    GRAPHICS→TEXT
    <CORRECTION COUNT>
      5
    </CORRECTION COUNT>
  </OBJECT>
</ATTRIBUTE CORRECTION INFORMATION>

</DEVICE>
```

FIG. 4B

```
[COMMON-IN-JOB METADATA]
<JOB>
  <DATE>2006/11/24</DATE>
  <CREATOR>AKASHI MASAMICHI</CREATOR>
  <APPLICATION>Illustrator
    <VERSION>12.0.1</VERSION>
  </APPLICATION>
  <OS>MacOSX
    <VERSION>10.4.8</VERSION>
  </OS>
  <PDL>PostScript
    <VERSION>3</VERSION>
  </PDL>
  <ICCProfile>
    <SRC>AdobeRGB</SRC>
    <DST>MFP1</DST>
  </ICCProfile>
</JOB>
```

301

```
[COMMON-IN-PAGE METADATA]
<PAGE>
  <SIZE>A4</SIZE>
  <MEDIUM>COATED PAPER</MEDIUM>
</JOB>
```

310

F I G. 4C 311-1

[METADATA]
<OBJECT>
　<ATTRIBUTE>TEXT</ATTRIBUTE>
　<NAME>Garamond</NAME>
　<SIZE>12</SIZE>
　<CONTENTS>Gears</CONTENTS>
</OBJECT>

311-2

[METADATA]
<OBJECT>
　<ATTRIBUTE>GRAPHICS</ATTRIBUTE>
　<INFORMATION>BEZIER</INFORMATION>
</OBJECT>

311-3

[METADATA]
<OBJECT>
　<ATTRIBUTE>IMAGE</ATTRIBUTE>
　<INFORMATION>CMYK</INFORMATION>
　　<ICCProfile>
　　　<SRC>AdobeRGB</SRC>
　　　<DST>ISO Coated</DST>
　　</ICCProfile>
</OBJECT>

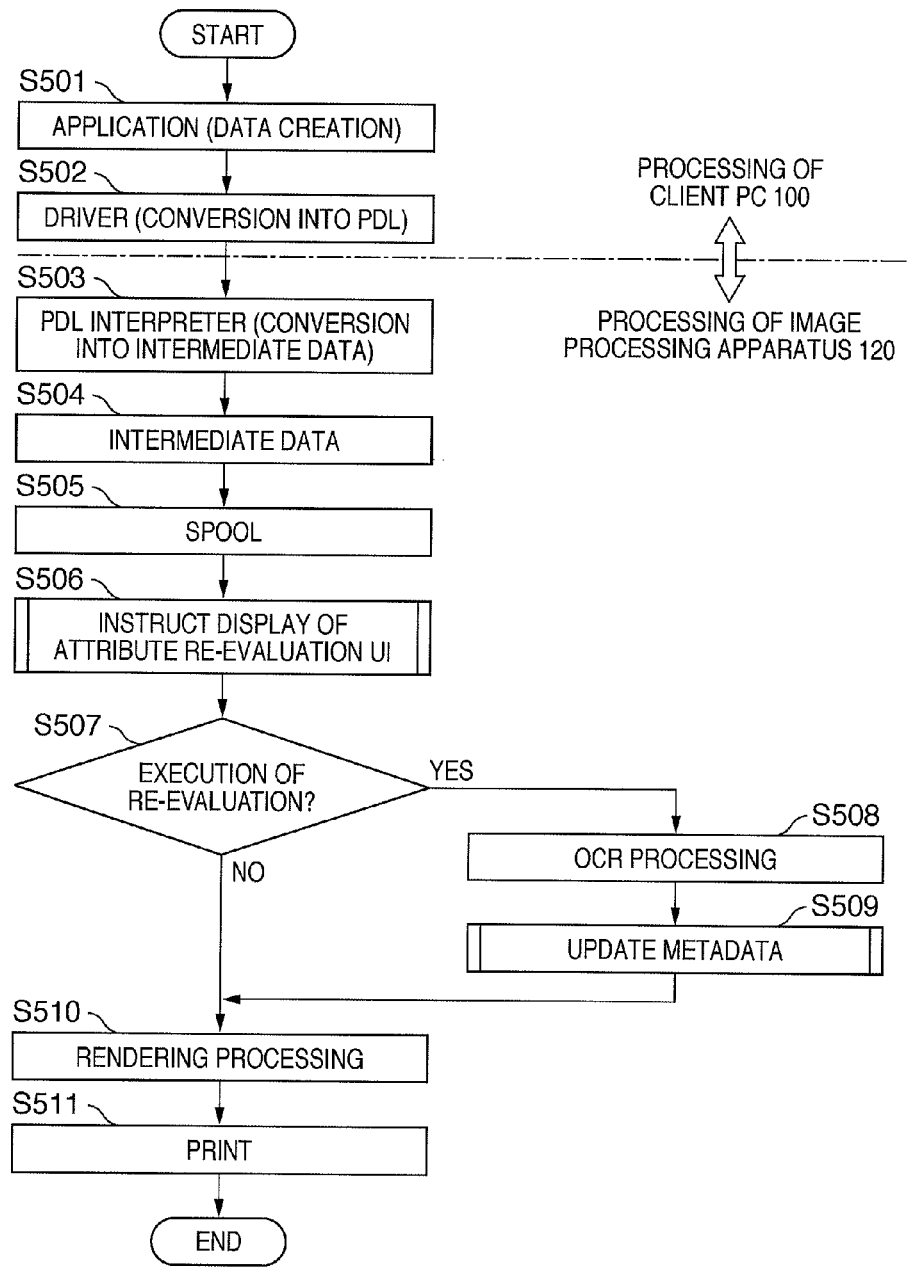

IMAGE PROCESSING APPARATUS, IMAGE PROCESSING METHOD, AND PROGRAM TO EXECUTE IMAGE PROCESSING METHOD

BACKGROUND OF THE INVENTION

1. Field of the Invention

The present invention relates to an image processing apparatus, an image processing method, and a program to execute an image processing method and, more particularly, to a technique of determining, in accordance with an operation environment at the time of PDL printing, whether to automatically re-evaluate an attribute determined by an application and a PDL analysis process upon PDL data printing.

2. Description of the Related Art

Recent copying machines are expanding functions at remarkable speed by digitizing internal image processing. Examples of fundamental functions are a copy function of duplicating a document, and a PDL function that enables printing of a document created in a host computer. In addition to these functions, a copying machine has a SEND function of externally sending a document from the copying machine via a network, and a BOX function that allows storing, in the copying machine, a document image generated by the copy function or PDL function and reuse it. There are also provided many other functions including editing functions such as combining and bookbinding using a document image stored in the copying machine by the BOX function.

On the other hand, the demand for image quality is high, and to meet the requirement for higher document reproducibility, a copying machine is steadily raising its image processing resolution from 600 dpi to 1,200 dpi, and then to 2,400 dpi, and the number of signal bits from 8 bits to 10 bits, and then to 12 bits. Memories and storages are added to store bitmap data with an enormous amount of information for internal processing, and a high-end CPU replaces a conventional one. This drives up device and development costs to a non-negligible level.

The functions use a technique of obtaining higher image quality in PDL data printing by dividing objects into attributes such as Text, Graphics, and Image. Text can increase image quality by high resolution halftone processing and edge processing for suppressing jaggy. Graphics uses high resolution halftone processing, and Image uses halftone halftone processing or the like to obtain higher image quality.

There also exists a technique of generating vector data by vectorizing bitmap data, and an OCR technique of converting bitmap data into font data.

A technique of executing vectorization for only designated vectorization target object (Japanese Patent Laid-Open No. 2005-159517), and a technique of designating an object type on a driver (Japanese Patent Laid-Open No. 2001-253125) are also available.

In the above-described conventional techniques, however, if an application has sent text data not of textual attribute but of image attribute or graphical attribute, a user always needs to input, at the time of processing, an attribute correcting instruction for appropriate image processing. Even in a client operation environment (e.g., application, OS, or PDL type) where mismatch between data and its attribute never occurs, and a correcting instruction is unnecessary, the attribute correction processing prolongs the output time.

If an attribute correcting instruction needs to be issued for data containing many objects, searching for a target object is very time-consuming.

SUMMARY OF THE INVENTION

The present invention has been made in consideration of the above-described problems, and provides an image processing method and an image processing apparatus to automatically execute attribute information correction processing without troubling a user in a client operation environment where attribute information has been corrected once.

The present invention also provides an image processing method and an image processing apparatus to execute usual processing and prevent the process time from always becoming longer in a user operation environment where mismatch between data and its attribute never occurs.

The present invention further provides an image processing method and an image processing apparatus to enable to easily find a target object in data containing many objects, which is conventionally very difficult to find a target object at the first correction.

In order to solve the above-described problems, according to the present invention, there is provided an image processing apparatus comprising: a reception unit adapted to receive from a client, an image and an object included in the image; a storage unit adapted to store an operation environment of the client as metadata of the object included in the image; an evaluation unit adapted to evaluate an attribute of the object received by the reception unit; a recording unit adapted to, when an instruction is input to re-evaluate the attribute of the object which has undergone attribute evaluation by the evaluation unit, make as metadata a record indication that the attribute has been re-evaluated; and an execution unit adapted to, upon receiving another image different from the image, when an operation environment of a client which has instructed to perform image processing of the other image is identical to the operation environment of the client which is stored by the storage unit, and the record is in the recording unit indicating that the attribute has been re-evaluated, execute re-evaluation of attribute of the received other image.

Also, there is provided an image processing apparatus comprising: a reception unit adapted to receive an image from a client; and an execution unit adapted to, when there is information representing that another image has been received from the client in the past, and an attribute of an object included in the other image has been evaluated and then re-evaluated, execute re-evaluation of an evaluated attribute of an object included in the received image.

According to the present invention, it is possible to automatically execute attribute information correction processing without troubling a user in a client operation environment (application, OS, or PDL) where attribute information has been corrected once, and make data and its attribute match each other.

Even in a user operation environment where mismatch between data and its attribute never occurs, usual processing suffices. This prevents the process time from always becoming longer.

Conventionally, it is very difficult to find a target object in data containing many objects at the first correction. However, it is possible to easily find a target object.

Further features of the present invention will become apparent from the following description of exemplary embodiments with reference to the attached drawings.

BRIEF DESCRIPTION OF THE DRAWINGS

FIG. 1B is a sectional view showing an arrangement example of an image processing apparatus according to the embodiment;

FIGS. 4A to 4C are views showing an example of the structure in metadata according to the embodiment;

FIG. 5 is a flowchart illustrating an outline of an example of first print processing according to the first embodiment;

DESCRIPTION OF THE EMBODIMENTS

The embodiments of the present invention will now be described in detail with reference to the accompanying drawings.

<Arrangement Examples of Image Processing System of Embodiment>

Figure 1A:
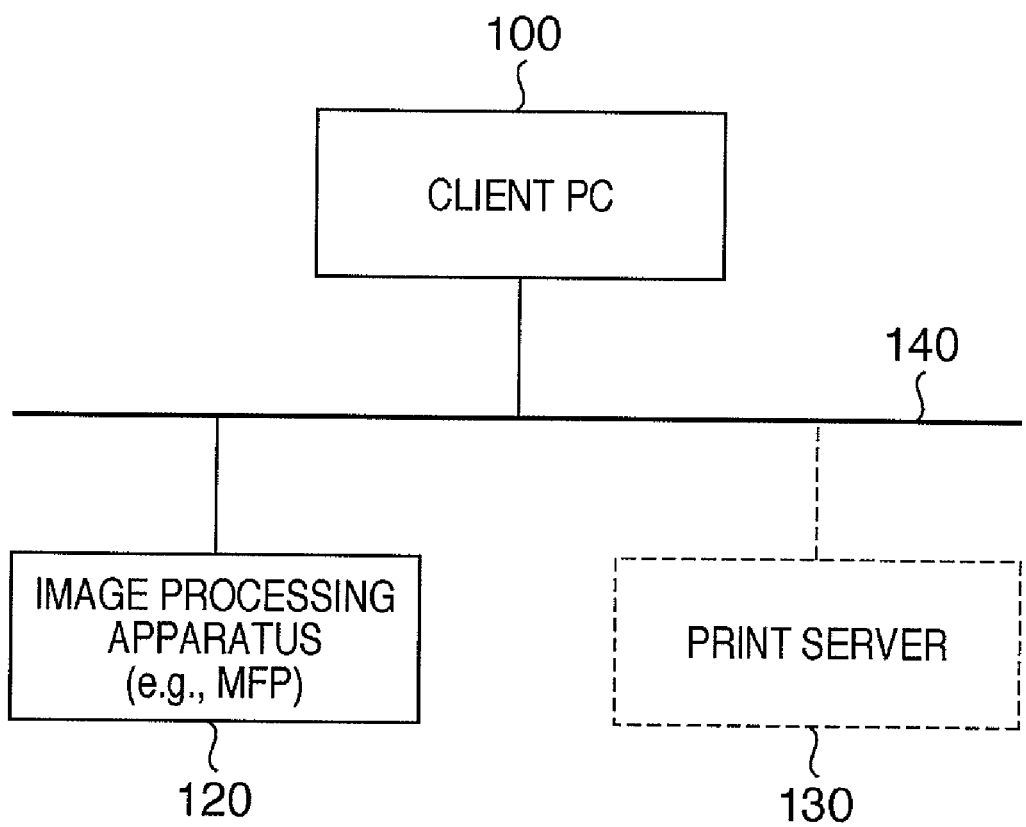
FIG. 1A is a block diagram showing an arrangement example of an image processing system according to an embodiment.

FIG. 1A is a block diagram showing the arrangement of an image processing system according to an embodiment of the present invention.

An image processing apparatus according to the first embodiment is implemented in an operation environment where a client PC 100 referred to as an information processing apparatus is connected to an image processing apparatus 120 via a network 140. The client PC of this embodiment includes a control unit (not shown) to control the client operation environment (application, OS, or PDL) and drivers. The image processing apparatus 120 is a multi-function peripheral (MFP). However, the present invention is not limited to this. The arrangement shown in FIG. 1A is merely an example. The apparatuses may be connected directly by a USB or the like, instead of using the network 140. The system may include a plurality of client PCs or a plurality of MFPs.

On the other hand, an image processing system according to the second embodiment implements the present invention in an operation environment where a print server 130 indicated by a broken line in FIG. 1A is connected to a client PC 100 and an image processing apparatus 120 via a network 140.

<Arrangement Example of Image Processing Apparatus of Embodiment>

The arrangement of the color MFP 120 that is an MFP suitable to apply the present invention will be described with reference to FIG. 1B. The color MFP is a 1D-type color multi-function peripheral which forms a color image using one drum.

The 1D-type color MFP includes a scanner unit (document exposure unit in FIG. 1B) 101, a laser exposure unit 102, a photosensitive drum 103, an image forming unit 104, a fixing unit 105, a paper feed/conveying unit 106, and a printer control unit (not shown) which controls these components.

The scanner unit 101 optically reads a document image by illuminating a document placed on the document table, and converts the image into an electrical signal, thereby creating image data.

The laser exposure unit 102 inputs a light beam such as a laser beam modulated based on the created and received image data to a polyhedral mirror (polygon mirror) which rotates at a uniform angular velocity, and irradiates the photosensitive drum 103 with the reflected scan light.

The image forming unit 104 forms an image by executing the following series of electrophotographic processes. The image forming unit 104 rotates the photosensitive drum 103, charges it by a charger, develops, using toners, a latent image formed on the photosensitive drum 103 by the laser exposure unit 102, and transfers the toner image to a sheet. The image forming unit 104 collects toner powder that remains on the photosensitive drum 103 without being transferred. The sheet winds at a predetermined position around a transfer drum 107 and rotates four times. During the rotations, developing units (developing stations) having magenta (M), cyan (C), yellow (Y), and black (K) toners repeatedly execute the electrophotographic processes in turn. After the four revolutions, the sheet on which a full-color toner image of four colors is transferred is separated from the transfer drum 107 and conveyed to the fixing unit 105.

The fixing unit 105 includes a combination of rollers and belts and incorporates a heat source such as a halogen heater. The fixing unit 105 dissolves and fixes, by heat and pressure, the toners on the sheet with the toner image transferred by the image forming unit.

The paper feed/conveyance unit 106 includes one or more sheet storages represented by a sheet cassette or a paper deck. The paper feed/conveyance unit 106 separates one of a plurality of sheets stored in a sheet storage, and conveys it from the image forming unit 104 to the fixing unit 105 in accordance with an instruction from the printer control unit (not shown). The sheet is wound around the transfer drum 107 of the image forming unit 104, rotated four times, and conveyed to the fixing unit 105. During the four revolutions, the above-described YMCK toner images are transferred to the sheet. To form images on both sides of a sheet, control is performed so that the sheet which has passed through the fixing unit 105 passes through the conveyance path to the image forming unit 104 again.

The printer control unit (not shown) communicates with a control unit for controlling the entire color MFP, and executes control in accordance with an instruction from it. The printer control unit manages the states of the above-described scanner, laser exposure, image forming, fixing, and paper feed/conveying units, and issues instructions to make them smoothly operate in cooperation with each other.

(Arrangement Example 1 of Control Unit)

Figure 1C:
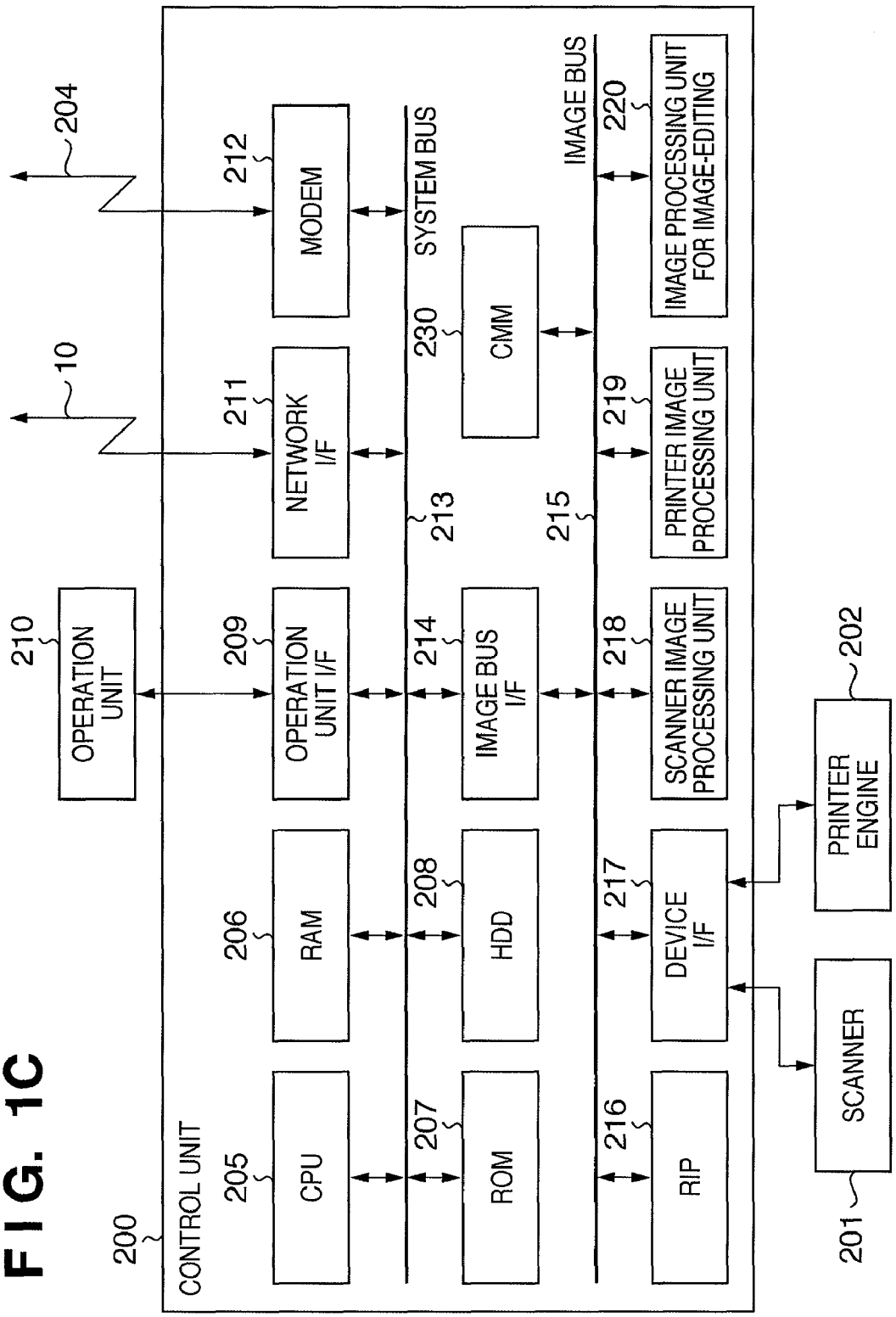
FIG. 1C is a block diagram showing an arrangement example of the control unit of the image processing apparatus according to the embodiment.

FIG. 1C is a block diagram showing an arrangement example of the control unit (also called the controller) of the color MFP 120 according to this embodiment.

Referring to FIG. 1C, a control unit 200 is connected to a scanner 201 serving as an image input device and a printer engine 202 serving as an image output device to perform control for image data reading and print output. The control unit 200 is also connected to a LAN 10 and a public line 204 to perform control to input or output image information and device information via the network.

In the control unit 200 shown in FIG. 1C, a CPU 205 is a central processing unit for controlling the entire color MFP 120. A RAM 206 serves as both a system work memory for the operation of the CPU 205 and an image memory for temporarily storing input image data. The RAM 206 also temporarily stores various kinds of flags determined at branches in flowcharts to be described later and set by the user, in addition to image data. A ROM 207 is a boot ROM which stores the boot program of the system. An HDD 208 is a hard disk drive which stores, for example, system software for various kinds of processing and input image data and document files.

Figure 3:
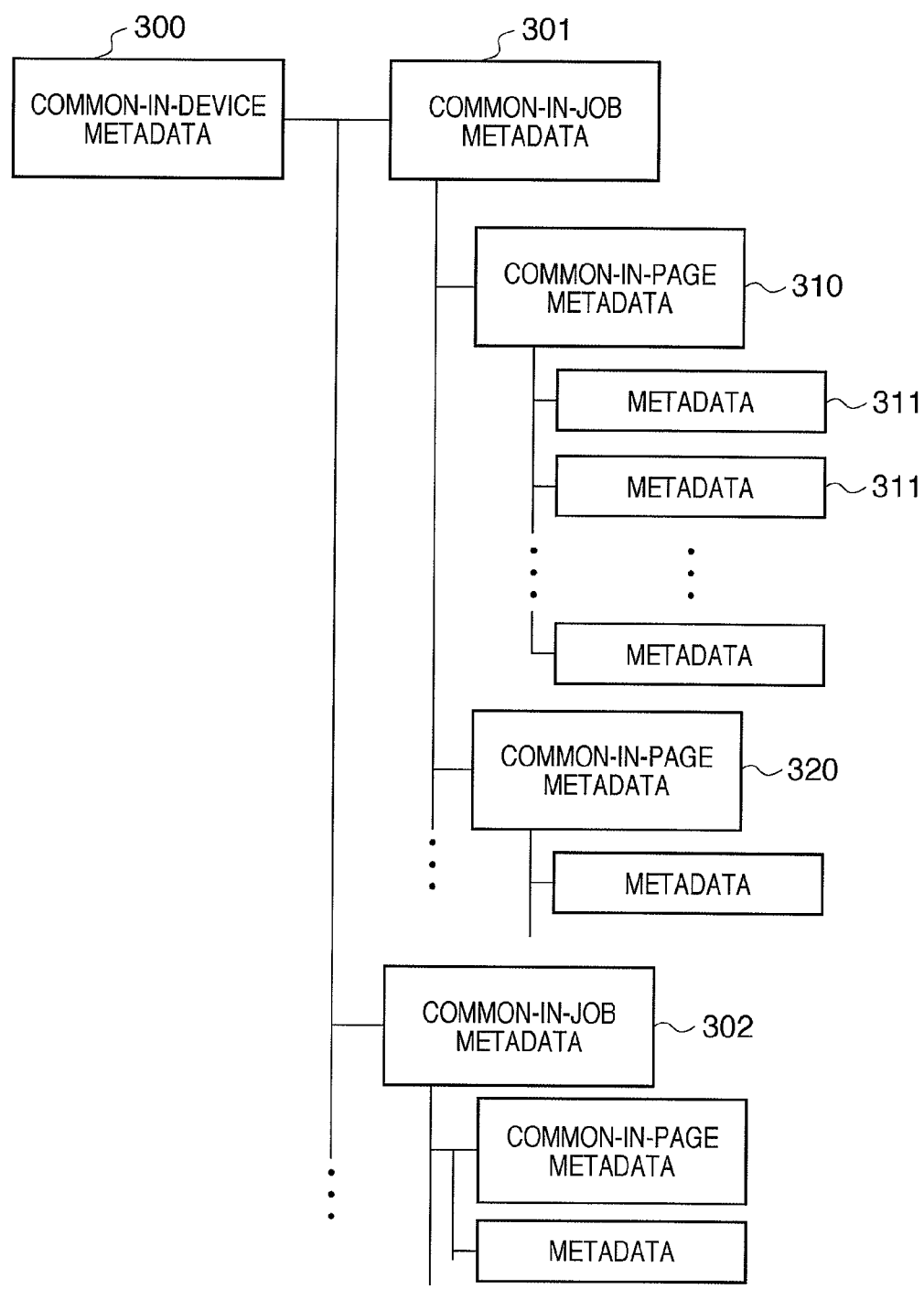
FIG. 3 is a view showing an example of the structure of metadata according to the embodiment.

The HDD 208 also stores metadata of this embodiment shown in FIGS. 3 and 4 in association with image data. The HDD 208 additionally stores application programs which include programs illustrated by the flowcharts in FIGS. 5, 6, 10, 12, and 13 to be described later, and are executed by the CPU 205. The programs are loaded to the RAM 206 and executed. Alternatively, the application programs may be supplied by an external storage device (not shown) such as a CD, or downloaded via a network.

Referring to FIG. 1C, an operation unit I/F 209 is an interface to an operation unit 210 having a display screen capable of displaying image data or the like, and outputs image data to the operation unit 210. The operation unit I/F 209 also transmits information input by the operator (i.e., the user of the image processing system) via the operation unit 210 to the CPU 205. A network interface 211 is implemented by, for example, a LAN card and connected to the LAN 10 corresponding to the network 140 in FIG. 1A to output/receive information to/from an external apparatus. A modem 212 is connected to the public line 204 to output/receive information to/from the external apparatus.

In the control unit 200 of this embodiment, the above-described devices are arranged on a system bus 213.

An image bus I/F 214 is an interface to connect the system bus 213 to an image bus 215 for transferring image data at a high speed. The image bus I/F 214 serves as a bus bridge for converting the data structure. The image bus 215 is formed from a PCI bus or IEEE1394. A RIP 216, a device I/F 217, a scanner image processing unit 218, a printer image processing unit 219, an image processing unit for image-edition 220, and a color management module (CMM in FIG. 1C) 230 (all will be described below) are connected to the image bus 215.

The raster image processor (RIP) 216 interprets a display list (DL), and creates (renders) a raster image and attribute bits corresponding to the respective pixels of the raster image. The device I/F 217 connects the scanner 201 and the printer engine 202 to the control unit 200, and performs image data conversion between a synchronous system and an asynchronous system.

The scanner image processing unit 218 executes various kinds of processing such as correction, manipulation, and editing of input image data. The printer image processing unit 219 executes processing such as correction and resolution conversion according to the printer for image data to be printed. The image processing unit for image-edition 220 executes image data rotation, image data compression/decompression processing, and various kinds of image processing based on the attribute bits generated by the RIP 216. The CMM 230 is a dedicated hardware module which performs color conversion processing of image data based on a profile or calibration data.

First Embodiment

<Example of Data Flow in Image Processing of First Embodiment>

Figure 2:
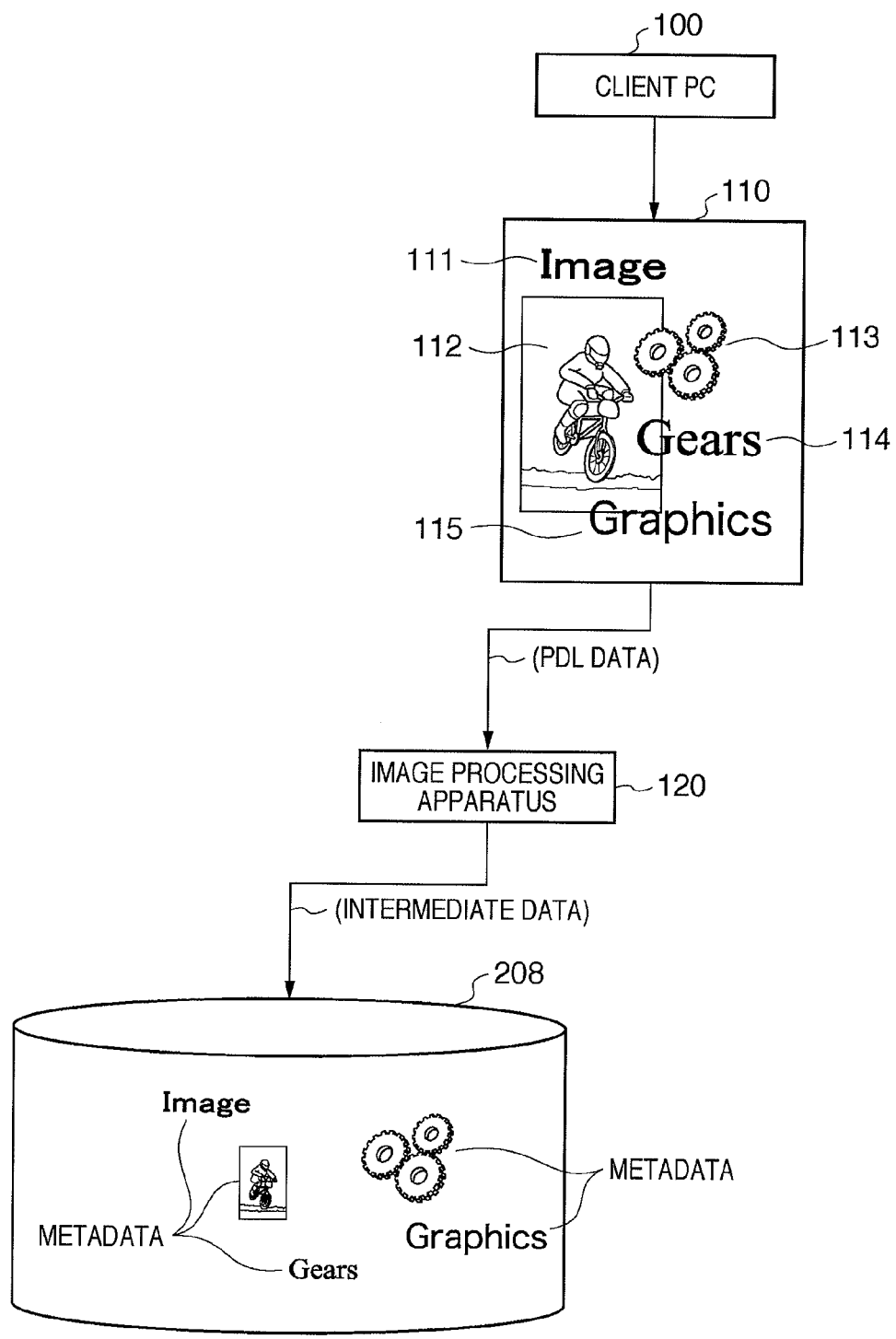
FIG. 2 is a view showing an example of a data flow according to the first embodiment.

An example of the data flow in image processing according to the first embodiment in the arrangement of the above-described image processing system will be described with reference to FIG. 2.

Print data created by an application on the client PC 100 is converted by a driver into PDL data optimum for the image processing apparatus 120. The client PC 100 transfers the PDL data to the image processing apparatus 120 via the network 140. In this embodiment, an example in which a page 110 is printed will be examined.

The page 110 to be printed by the user includes image objects, graphics objects, and a text object created by the application and driver. More specifically, in the page 110, objects 111 and 112 are created as bitmap images. Objects 113 and 115 are graphics objects. An object 114 is a text object. These data are transmitted from the client PC 100 to the image processing apparatus 120 via the network 140 as PDL data. The received PDL data is converted into intermediate data of each object by an interpreter in the image processing apparatus 120, and stored in a secondary storage device (HDD 208 in FIG. 1C).

The secondary storage device (HDD 208) can store each object included in a document. It is possible to add, to each object, metadata representing the features of the object.

<Example of Structure of Metadata of Embodiment>

The structure of metadata held in the HDD 208 of the image processing apparatus 120 will be explained next with reference to FIG. 3.

As shown in FIG. 3, metadata has a hierarchical structure. For example, common-in-device metadata 300 to hold the information of the image processing apparatus 120 and other basic information exists in the uppermost layer. Lower layers of the common-in-device metadata 300 store common-in-job metadata 301 and 302 each of which is common in a job and holds information of a job to be processed by the image processing apparatus 120. Each of the common-in-job metadata 301 and 302 describes the creation date representing the job entry date, the creator, the application used for creation, the driver version, the PDL name, and the version name of the data.

Lower layers of each of the common-in-job metadata 301 and 302 store common-in-page metadata 310 and 320 of respective pages included in a job. Each of the common-in-page metadata 310 and 320 of respective pages describes the size, medium, and color information of a corresponding page.

Lower layers of each of the common-in-page metadata 310 and 320 store metadata 311 of respective objects in a page. The metadata 311 of each object describes the attribute (Graphics, Image, or Text) of the object. For, for example, a Text object, the metadata 311 holds the text contents.

(Detailed Example of Metadata Contents)

A detailed example of metadata will be described with reference to FIGS. 4A-4C. Note that FIGS. 4A-4C shows an example of metadata, and effective items are prepared in accordance with its purpose or object.

Data common in the device, such as the device name and attribute correction information are held as the common-in-device metadata 300. Next, Information such as the job entry date, job creator, application, OS, and PDL are held as the common-in-job metadata 301. Then, the size, medium, and the like are held as the common-in-page metadata 310.

The metadata 311 of respective objects will be described concerning each of three attributes. A metadata example 311-1 of a text object holds attribute information (<attribute> in FIG. 4C), font name (<name> in FIG. 4C), size (<size> in FIG. 4C), and contents (<contents> in FIG. 4C). A metadata example 311-2 of a graphical attribute holds attribute information (<attribute> in FIG. 4C) and information (<information> in FIG. 4C) of graphics such as a function. A metadata example 311-3 of an image attribute holds attribute information (<attribute> in FIG. 4C) and information (<information> in FIG. 4C) of, for example, a compression method. The metadata example 311-3 of the image attribute defines again an ICCProfile tag that is defined in the common-in-job metadata 301. This method is also usable without any problem.

In this embodiment, XML is used as a language to describe metadata. However, any other description method can be used.

<Example of Image Processing Procedure of First Embodiment>

The image processing procedure of the arrangement of the image processing system according to the embodiment will be described below in detail.

<Example of Procedure Including Attribute Re-Evaluation by User Instruction in PDL Printing>

An example of the procedure of a method of re-evaluating an object attribute in accordance with a user's instruction will be described with reference to the flowchart in FIG. 5. Referring to FIG. 5, steps S501 and S502 are processes in the client PC 100. Processing in the image processing apparatus 120 starts from step S503. This processing is executed by the CPU 205.

First, the user normally creates data by an application on the client PC 100 (S501). When the user inputs a print instruction from the application, a selected driver converts the data into PDL data processable by the image processing apparatus 120. The PDL data is transmitted via the network 140 (S502).

The image processing apparatus 120 receives the PDL data and causes a PDL interpreter to process and interpret the PDL data (S503). When the process of the interpreter has ended, the PDL data is converted into intermediate data independent of the PDL (S504). Then, the intermediate data is spooled to a secondary storage device (HDD 208) (S505).

Figure 7:
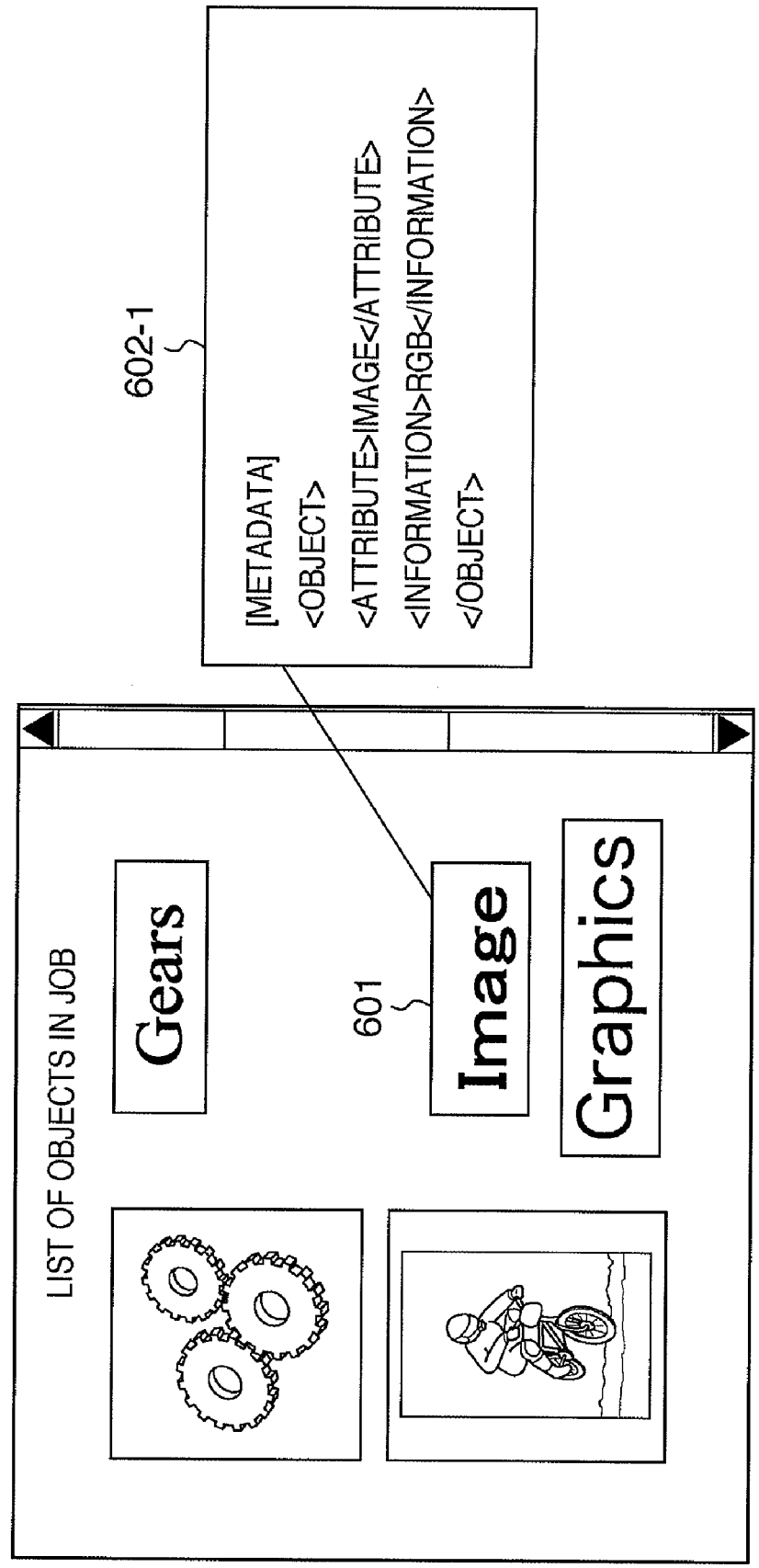
FIG. 7 is a view showing an example of an operation window according to the embodiment.

An attribute re-evaluation UI (FIG. 7) capable of instructing object attribute re-evaluation is generated, and an instruction is input to display the generated window (S506). The display is preferably done via a Web browser. However, the present invention is not limited to this. A re-evaluation object is selected on the display screen (FIG. 7). Upon detecting that the user has pressed an execution button (corresponding to a start button 701 in FIG. 8), the CPU 205 branches from step S507 to step S508. The selected re-evaluation object undergoes character recognition by, for example, OCR processing (S508). The metadata in the HDD 208 is updated (S509).

After that, independently of whether re-evaluation is executed or not, the intermediate data converted in step S504 is rendered based on the metadata (S510), and printed (S511).

(Update Metadata: Example of Process Procedure of S509)

An example of the process procedure of metadata updating (S509) in FIG. 5 will be described in detail with reference to the flowchart in FIG. 6.

First, it is confirmed based on, for example, the OCR processing result (S508-S509) whether the attribute information has changed (S1001).

If the attribute information has changed, whether the original attribute assigned first by the application is "image", and the original attribute should change to "text" (S1002). If the attribute should change from "image" to "text", attribute information (<attribute>) in the metadata 311 changes from "image" to "text" (S1003). It is determined whether the font name is known upon OCR processing (S1004). If the font name is known, the font name is added to the font name (<name>) in the metadata (S1005). Similarly, the font size (<size>) is also added to the metadata 311 (S1006). The found text contents are also added to the contents (<contents>) in the metadata (S1007).

Next, an operation environment tag (<operation environment>) is searched for in the attribute correction information (<attribute correction information>) of the common-in-device metadata 300 (S1008). It is determined whether identical operation environment information exists (S1009). If there is no identical operation environment information, an operation environment tag is newly created (S1010), and a correction count tag (<correction count>) is incremented (S1011). Correction count tags are prepared in a number equal to the number of types of attribute changes. An identical operation environment indicates an operation environment identical to the client operation environment (type and version of the application, the type and version of the OS, or the type of PDL) where the PDL has been generated.

For example, an application determines the attribute of a translucent character as "text". However, another application determines it as "image".

If the attribute should not change from "image" to "text" in step S1002, it is determined whether the attribute should change from "graphics" to "text" (S1012). If the attribute should change from "graphics" to "text", the same processing as in changing from "image" to "text" is performed. If the attribute should change from "image" to "graphics" (S1013), the attribute information tag (<attribute>) in the metadata 311 changes from "image" to "graphics" (S1014). An information tag (<information>) is also added (S1015).

<Example of Instruction UI Display Screen of Embodiment>

Figure 8:
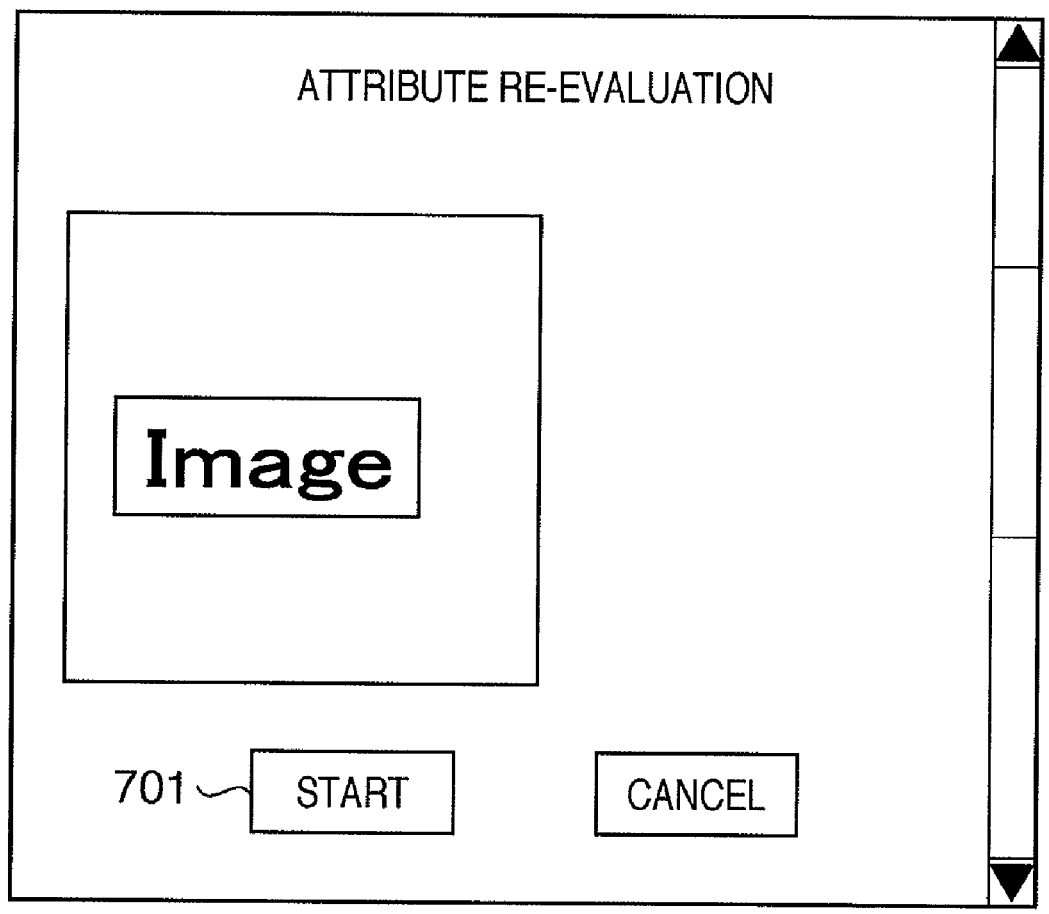
FIG. 8 is a view showing an example of the operation window upon attribute re-evaluation according to the embodiment.
Figure 9:
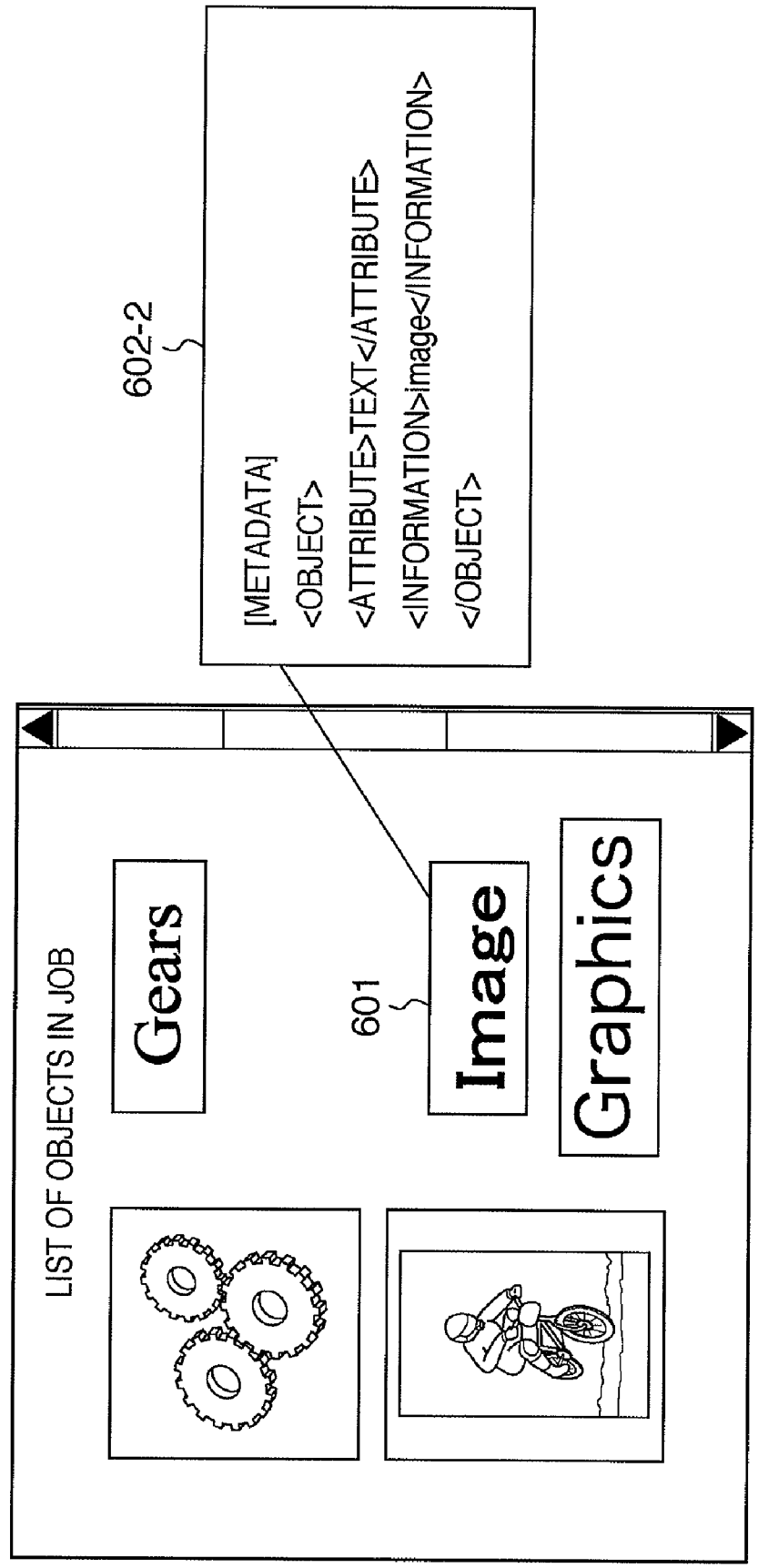
FIG. 9 is a view showing an example of the operation window after re-evaluation according to the embodiment.

FIGS. 7, 8, and 9 show an example of an attribute re-evaluation instruction using a UI in step S506 of FIG. 5. The display screen displays a list of all objects included in a designated job. If an enormous number of objects exist, the objects may be displayed in a smaller size or a scroll or divisionally in a plurality of pages.

(Object List Window: FIG. 7)

First, an instruction to display an object list window in FIG. 7 is input. The user selects, for example, an object 601 in the object list window as an attribute re-evaluation target. In this embodiment, each object in PDL data has "image" as the original attribute assigned by an application, and the user selects an object transmitted to the image processing apparatus 120.

Reference numeral 602-1 denotes metadata of the object 601. When the image processing apparatus 120 is notified that the user has selected the object 601, the CPU 205 is preferably automatically instructed to display the corresponding metadata 602-1.

(Attribute Re-Evaluation Instruction Window: FIG. 8)

When notified that the user has selected the object 601 in FIG. 7, the CPU 205 transits the display screen to the window shown in FIG. 8.

When the user presses the start button 701 on the display screen shown in FIG. 8, the CPU 205 receives the user instruction, and starts an attribute re-evaluation operation.

(Object List Window After Attribute Re-Evaluation: FIG. 9)

When the attribute re-evaluation operation has ended, the CPU transits the display screen to the object list window again as shown in FIG. 9. When the user selects the object 601 to confirm the metadata, an instruction to display metadata 602-2 corresponding to the object 601 is input. In the metadata 602-2, "image" that is the attribute initially assigned by the application in FIG. 7 has changed to "text" upon re-recognition by, for example, OCR processing, and the contents have also changed accordingly.

<Example of Process Procedure Upon Job Entry after Attribute Re-Evaluation>

Figure 10:
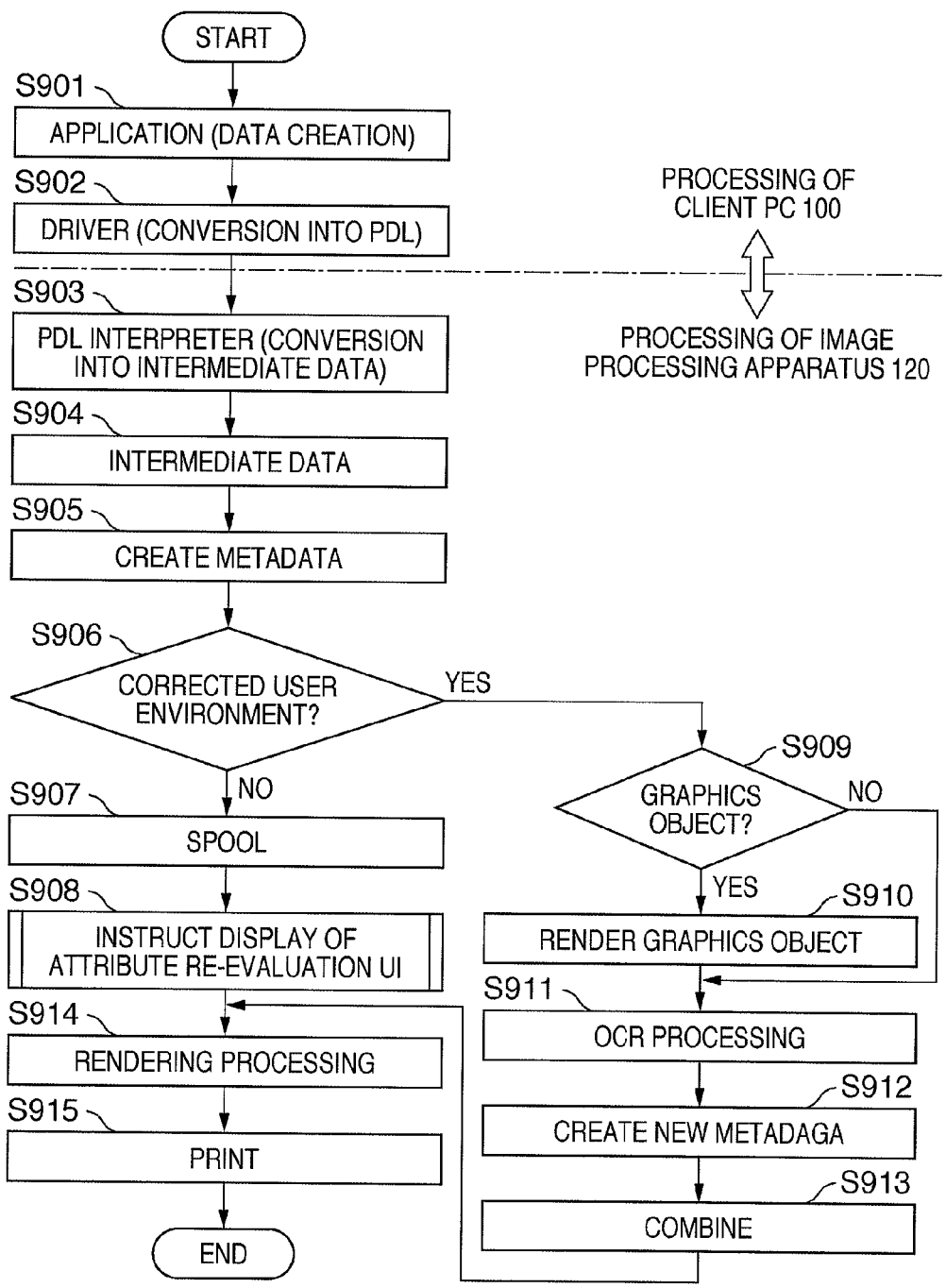
FIG. 10 is a flowchart illustrating an outline of an example of second or subsequent print processing according to the first embodiment.

An example of a process procedure upon job entry after attribute re-evaluation will be described with reference to the flowchart in FIG. 10. In FIG. 10 as well, steps S901 and S902 are processes in the client PC 100, as in FIG. 5. Processing in the image processing apparatus 120 starts from step S903. This processing is executed by the CPU 205.

The user creates print data by an application on the client PC 100 (S901). When the user inputs a print instruction from the application, a selected driver converts the data into PDL data processable by the image processing apparatus. The PDL data is transmitted from the client PC 100 to the image processing apparatus 120 (S902).

The image processing apparatus 120 receives the PDL data and causes an internal PDL interpreter to interpret the PDL data (S903). As the result of interpreter processing, the PDL data is converted into intermediate data independent of the PDL (S904), and metadata is created (S905).

At this time, the operation environment (<operation environment>) is searched for in the attribute correction information tag (<attribute correction information>) of the common-in-device metadata 300. It is confirmed whether the operation environment where the received PDL data is processed is a user operation environment already corrected in the past (S906). If the user has not corrected the operation environment in the past, the intermediate data is spooled (S907), and an instruction is input to cause the client PC 100 to display the attribute re-evaluation UI (S908), as in FIG. 5. For the sake of simplicity, FIG. 10 does not illustrate the re-evaluation execution processing in steps S507 to S509 of FIG. 5.

If it is determined in step S906 that the operation environment where the received PDL data is processed is a user operation environment corrected in the past, it is determined whether the object is a "graphics object" (S909). If the object is determined to be a "graphics object", the graphics object is temporarily rendered (S910). That is, for data transmitted from a client having an operation environment where the attribute has been corrected once, the object attribute is automatically corrected.

The rendering result in step S910 or a text or image object is subjected to OCR processing to determine the text (S911). A new object and new metadata are created (S912), and combined with the existing intermediate data (S913).

In any of the attribute re-evaluation performed based on a user instruction, the automatic attribute re-evaluation which occurs because of identical user operation environments, and the absence of re-evaluation, the overall page is rendered (S914), and the result is printed (S915).

In an operation environment where the user has corrected (re-evaluated) attribute information once, the above-described process procedure enables automatically re-evaluating attribute information without causing the user to input an instruction. In a user operation environment where re-evaluation is unnecessary, re-evaluation processing is not performed because no identical user operation environment is held. It is therefore possible to prevent the system from always taking the re-evaluation process time.

Second Embodiment

The second embodiment of the present invention will be described below in detail with reference to the accompanying drawings.

<Example of Data Flow in Image Processing of Second Embodiment>

Figure 11:
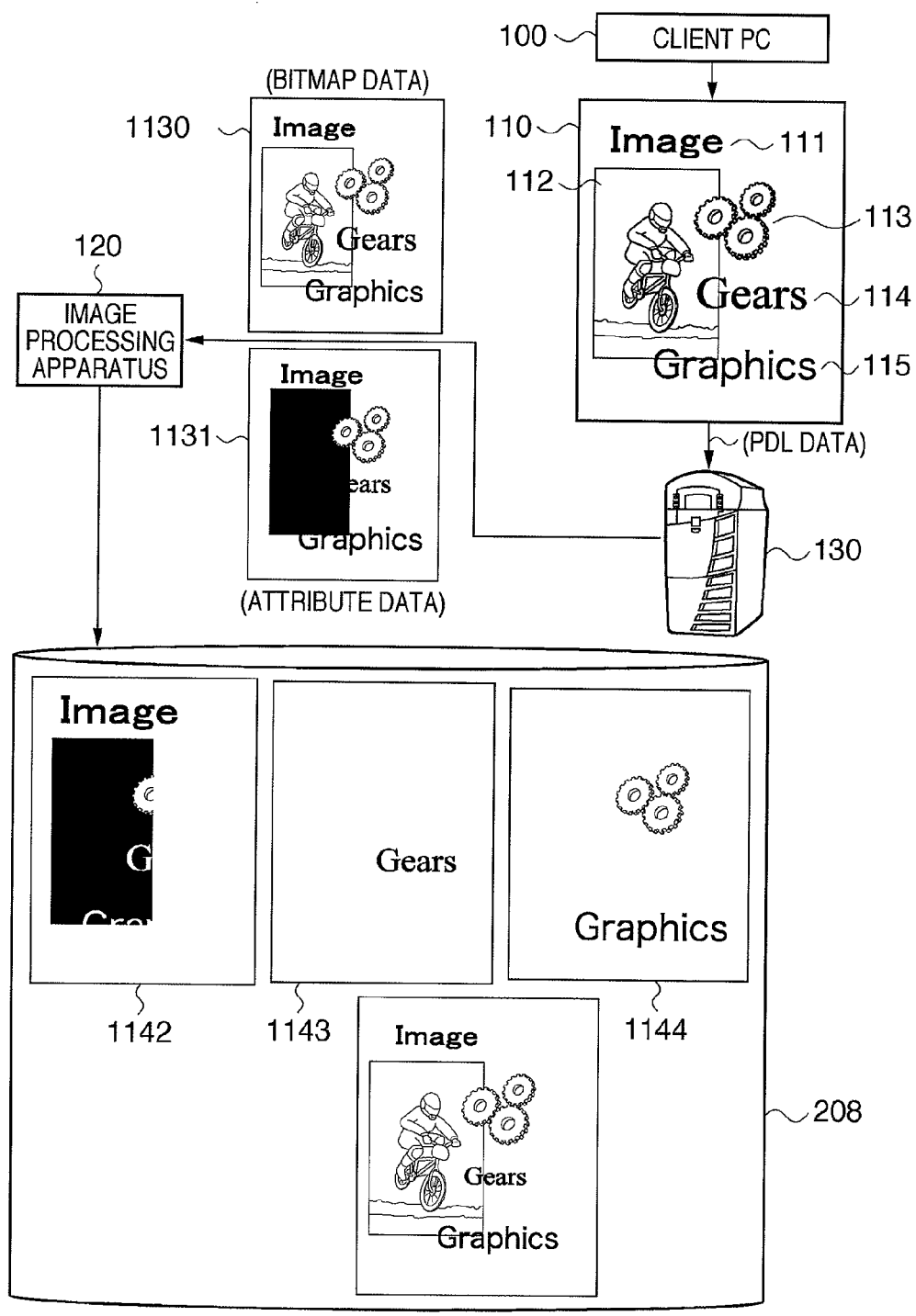
FIG. 11 is a view showing an arrangement example of a data flow according to the second embodiment.

In the second embodiment, an attribute information re-evaluation method in a form including a print server 130, which is indicated by a broken line in FIG. 1A and referred to as an image processing server, will be described with reference to the data flow in FIG. 11.

A user creates print data by an application on a client PC 100, and converts the print data by a driver into PDL data interpretable by the print server 130. PDL data 110 is transmitted to the print server 130.

The print server 130 transfers bitmap data 1130 obtained by rendering the received PDL data and attribute data 1131 to an image processing apparatus 120. In the attribute data 1131 of the second embodiment, for example, reference numerals 113 and 115 denote graphics objects; reference numerals 111 and 112, image objects; and reference numeral 114, a text object, as in FIG. 2.

The image processing apparatus 120 receives the rendered bitmap data 1130 and the attribute data 1131 and stores them in a secondary storage device (HDD 208). In particular, the attribute data 1131 is separated into an image portion 1142, a text portion 1143, and a graphics portion 1144, and held.

<Example of Image Processing Procedure of Second Embodiment>

Figure 12:
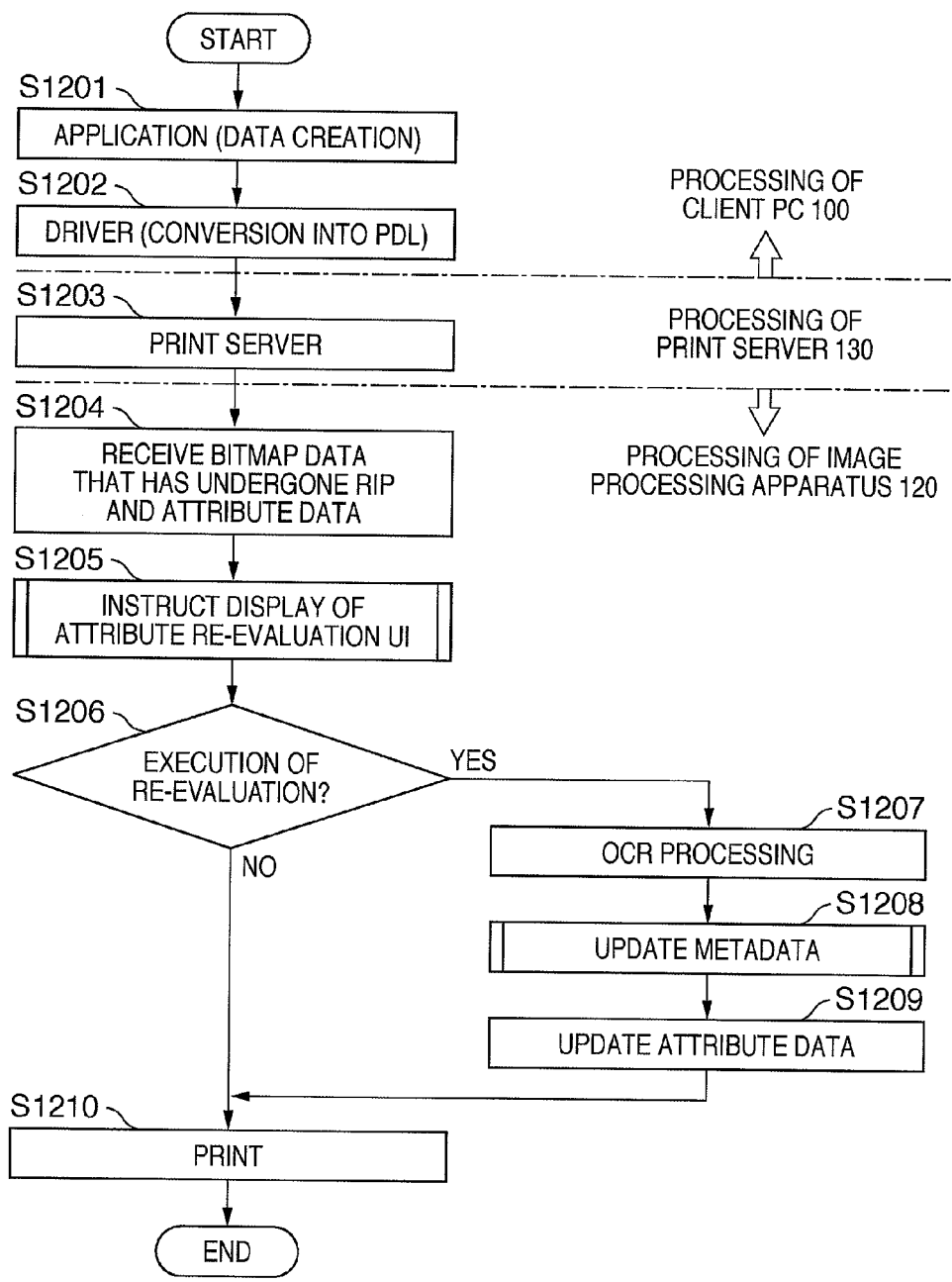
FIG. 12 is a flowchart illustrating an outline of an example of first print processing according to the second embodiment.

An example of the image processing procedure of according to the second embodiment will be described with reference to the flowchart in FIG. 12. Referring to FIG. 12, steps S1201 and S1202 are processes in the client PC 100. Step S1203 is a process in the print server 130. Processing in the image processing apparatus 120 starts from step S1204. This processing is executed by a CPU 205.

As in the first embodiment, the user creates print data by an application (S1201), generates PDL data by a driver, and transmits it to the print server 130 (S1202).

The print server 130 receives the PDL data. The print server 130 generates the rendered bitmap data 1130 and the attribute data 1131 from the PDL data and transfers them to the image processing apparatus 120 (S1203).

Figure 6:
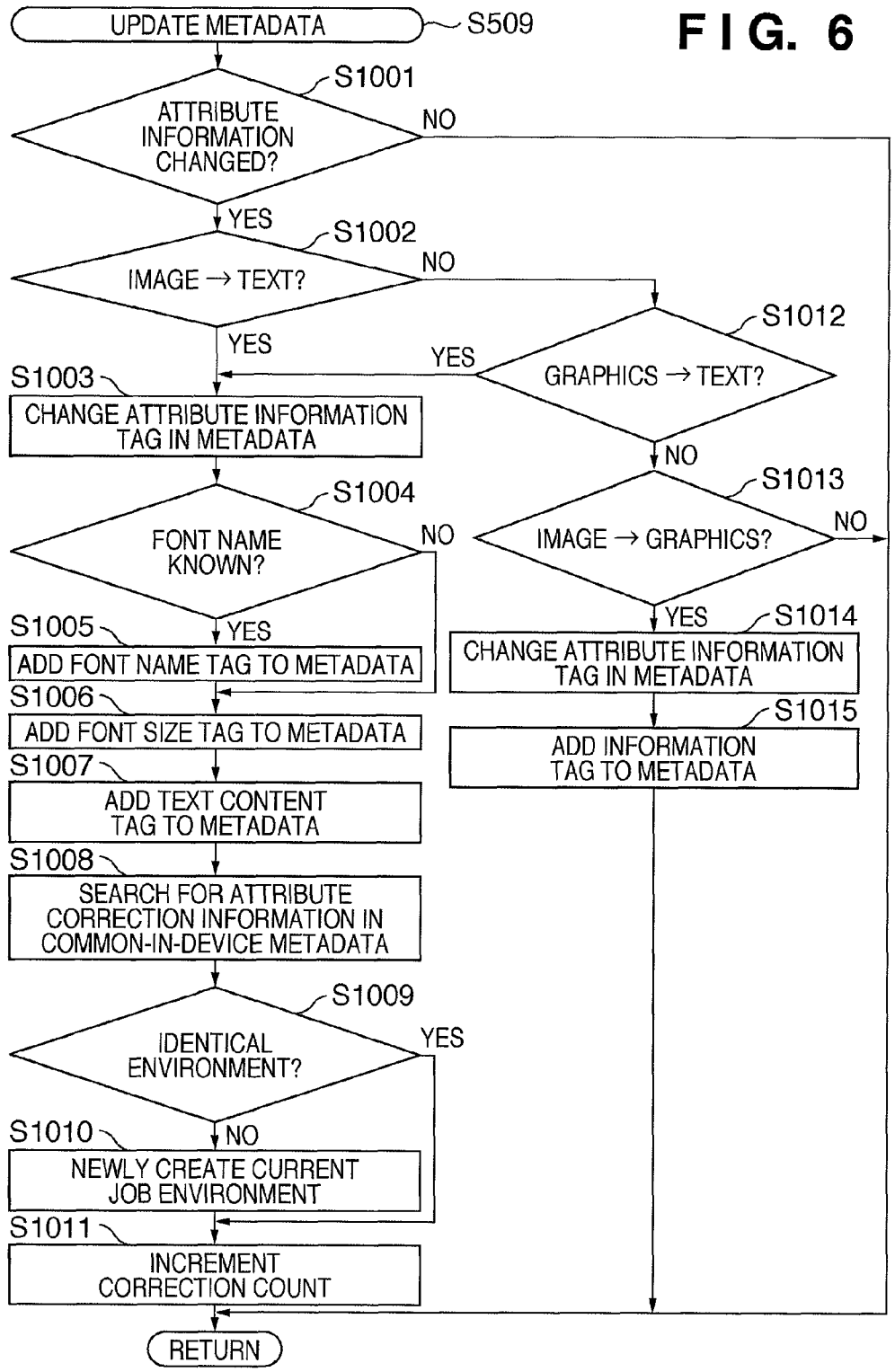
FIG. 6 is a flowchart illustrating an outline of an example of metadata updating according to the embodiment.

Upon receiving the bitmap data 1130 and the attribute data 1131 (S1204), the image processing apparatus 120 gives the instruction to display the same UI as in FIGS. 6 to 8 of the first embodiment (S1205).

The user selects an object as a re-evaluation execution target. It is determined whether a re-evaluation execution instruction is input (S1206). Upon receiving a notification of the re-evaluation execution instruction, the image processing apparatus 120 executes OCR processing for the portion of the object determined as the re-evaluation execution target (S1207), and updates metadata based on the result in accordance with the same procedure as in FIG. 6 of the first embodiment (S1208). After that, corresponding portions of the attribute data 1142 to 1144 are changed (S1209).

Printing is performed based on the bitmap data 1130 and the attribute data 1131 (S1210).

Processing from the second time, that is, processing following job entry after the attribute re-evaluation is the same as that of the first embodiment, and a description thereof will not be repeated. Even in printing PDL data in the operation environment using the print server 130 according to the second embodiment, when the user has corrected the attribute information once, attribute information re-evaluation processing can automatically be executed after correction, as in the first embodiment. In a user operation environment where re-evaluation is unnecessary, re-evaluation processing is not performed because no identical user operation environment is held. It is therefore possible to prevent the system from always taking the re-evaluation process time. In the second embodiment, since rendered data is transmitted to the image processing apparatus, the image processing apparatus need not execute the rendering processing.

The same effects as described above can be obtained even in a PDL data printing system without the print server 130 by executing the same processing as in the second embodiment after rendering processing.

Third Embodiment

In the examples of the above-described embodiments, all objects included in a designated job are displayed on the display screen as a list. However, if there is an enormous number of objects when giving the instruction for attribute correction, searching for a target object is very time-consuming.

In the third embodiment, a process example will be described in which the number of objects to be displayed on the display screen is appropriately limited to facilitate a target object search and selection of an attribute re-evaluation target object.

<Example of Procedure of Displaying Attribute Re-Evaluation UI>

Figure 13:
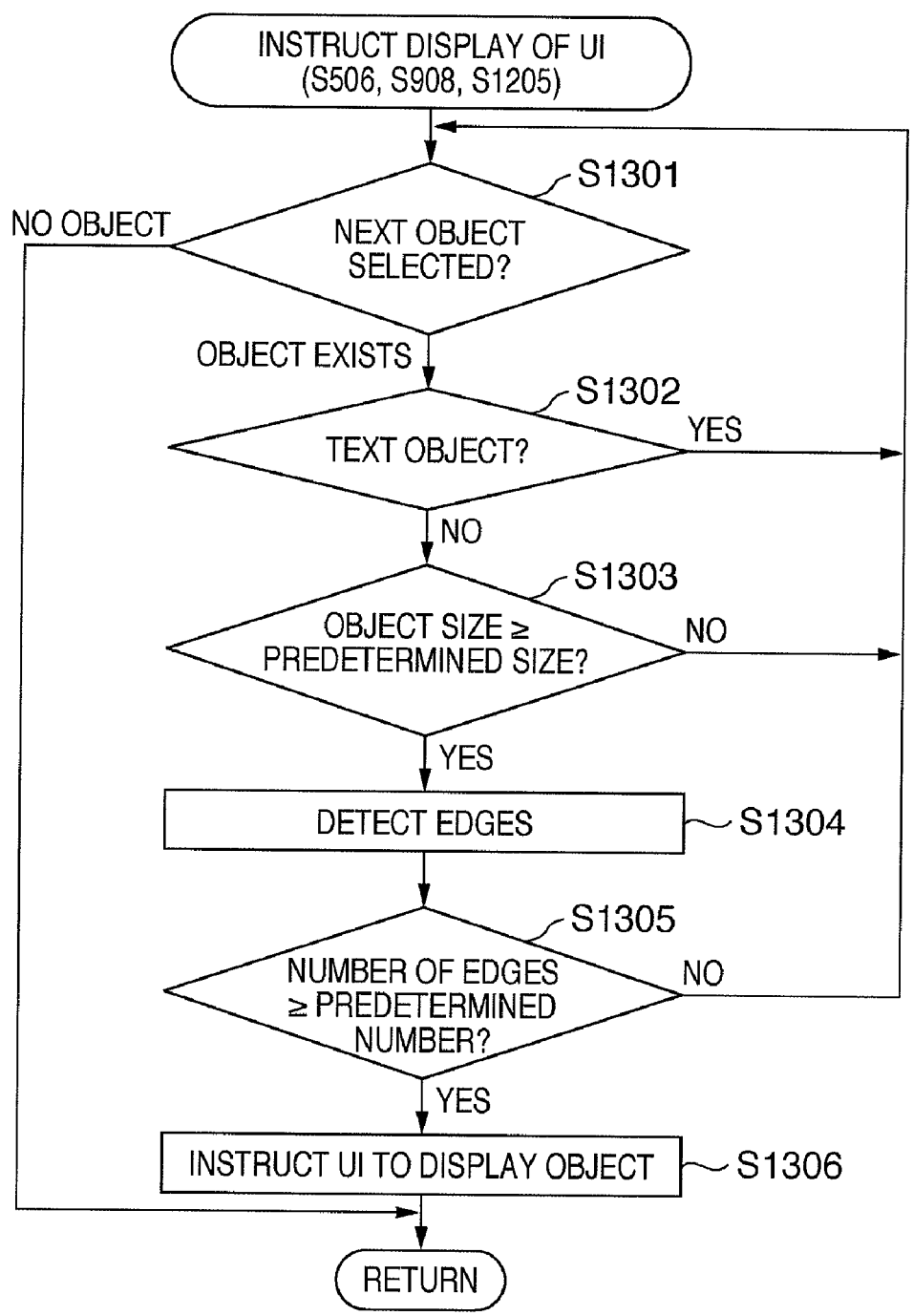
FIG. 13 is a flowchart illustrating an example of a procedure of displaying an attribute re-evaluation UI according to the third embodiment.

A procedure of selecting objects to be displayed in a UI window will be described with reference to the flowchart in FIG. 13. Note that the processing shown in FIG. 13 is applied to the processing of "attribute re-evaluation UI display instruction" of the above-described embodiments.

First, an object is selected from intermediate data (S1301), and it is determined whether the object is a text object (S1302). If so, since a text object is not a UI selection target, the process returns to step S1301 to select the next object.

If the object is not a text object, its size is confirmed. Then, it is determined whether the size has a predetermined value or more (S1303). If the size is small, the probability that the object is a text object is supposed to be low. If the object has a very small size, it is excluded from the UI display target. The process returns to step S1301 to select the next object.

If it is determined that the object has a predetermined size or more, the number of edges is counted to determine whether the object is a simple fill graphic pattern (S1304). It is determined whether the number of edges has a predetermined value or more (S1305). If the number of edges is small, the probability that the object is a text object is supposed to be low. For this reason, if the number of edges is smaller than a predetermined value so that the object is determined not to be a text object, the object is excluded from the UI display target. The process returns to step S1301 to select the next object.

Only when the number of edges has a predetermined value or more, the object is selected as a UI display target, and a mark is added to its metadata. The object is displayed on the display screen (S1306), and the process ends.

The number of edges serving as a threshold can be either fixed or changeable. The number of edges is preferably appropriately selected in accordance with the size of the display screen or the number of objects.

According to the third embodiment, when a designated job includes numerous objects, not all but only some objects satisfying predetermined conditions are displayed on the display screen. This facilitates a search of a target object.

Fourth Embodiment

In this embodiment, another example of selection of objects to be displayed in a UI window will be explained.

<Another Example of Procedure of Displaying Attribute Re-Evaluation UI>

In the fourth embodiment, an object list on the display screen shown in FIG. 7 according to the first to third embodiments is generated by selectively displaying only graphics objects or only image objects. This option can also be combined with the third embodiment.

According to the fourth embodiment, objects of a specific attribute are displayed in a list on the display screen. This facilitates a search of a target object and an operation upon change.

Other Embodiments

In the embodiments, the characteristic feature of the present invention has been described based on a print job by PDL data. However, the present invention is not limited to a print job by PDL data. For example, since the image processing apparatus 120 of the embodiments is a multi-function copying machine, the present invention is also applicable to, for example, scanner reading processing, copy processing, data transmission/reception processing, and facsimile transmission/reception processing.

The present invention is effective even when the image processing apparatus 120 is replaced with a client apparatus or a server apparatus. The present invention incorporates these apparatuses, too.

The present invention is also applicable to a system or integrated apparatus including a plurality of devices (e.g., host computer, interface device, and printer) or an apparatus including a single device.

The objects of the present invention are achieved even by supplying a storage medium (or recording medium) which records software program codes for implementing the functions of the above-described embodiments to the system or apparatus and causing the computer (or CPU or MPU) of the system or apparatus to read out and execute the program codes stored in the storage medium. In this case, the program codes read out from the storage medium implement the functions of the above-described embodiments by themselves, and the storage medium which stores the program codes constitutes the present invention. The functions of the above-described embodiments are implemented not only when the computer executes the readout program codes but also when the operating system (OS) running on the computer partially or wholly executes actual processing on the basis of the instructions of the program codes, as a matter of course.

Alternatively, the program codes read out from the storage medium are written in the memory of a function expansion card inserted into the computer or a function expansion unit connected to the computer. Then, the CPU of the function expansion card or function expansion unit partially or wholly executes actual processing on the basis of the instructions of the program codes. Such processing also implements the functions of the above-described embodiments, as a matter of course.

When the present invention is applied to the storage medium, it stores program codes corresponding to the above-described flowcharts.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2008-128790, filed May 15, 2008, which is hereby incorporated by reference herein in its entirety.

What is claimed is:

1. An image processing apparatus comprising:
   a reception unit constructed to receive from a client, an image and an object included in the image;
   a storage unit constructed to store an operation environment of the client as metadata of the object included in the image;
   an evaluation unit constructed to evaluate an attribute of the object received by the reception unit;
   a recording unit constructed to, when an instruction is input to re-evaluate the attribute of the object which has undergone attribute evaluation by the evaluation unit, make as metadata a record indication that the attribute has been re-evaluated; and
   an execution unit constructed to, upon receiving another image different from the image, when an operation environment of a client which has instructed to perform image processing of the other image is identical to the operation environment of the client which is stored by the storage unit, and the record is in the recording unit indicating that the attribute has been re-evaluated, execute re-evaluation of attribute of the received other image.

2. The apparatus according to claim 1, further comprising:
   a display instruction unit constructed to instruct to display a window which allows to instruct attribute re-evaluation of the object; and
   an update unit constructed to update the attribute of the object based on a result of attribute re-evaluation.

3. The apparatus according to claim 2, wherein the display instruction unit comprises a screen generation unit constructed to generate a screen on which display is performed to enable to select, as the attribute re-evaluation target, one of objects included in a job.

4. The apparatus according to claim 3, wherein
   the display instruction unit comprises a selection unit constructed to select several of objects included in a job based on a size of each object and the number of edges of each object, and
   the screen generation unit generates a screen on which display is performed to enable to select an object as the attribute re-evaluation target from the selected objects.

5. The apparatus according to claim 4, wherein each of the size of an object and the number of edges of an object has a value decided in accordance with an instruction from a user.

6. The apparatus according to claim 3, wherein
   the display instruction unit comprises a selection unit constructed to select graphics objects or image objects from objects included in a job, and
   the screen generation unit generates a screen on which display is performed to enable to select an object as the attribute re-evaluation target from the selected objects.

7. The apparatus according to claim 1, wherein in the attribute re-evaluation by the execution unit, character recognition is performed for the object that is a target of the re-evaluation instruction, and the metadata of the object is updated using an attribute obtained by re-evaluation.

8. The apparatus according to claim 1, wherein the metadata is held in a hierarchical structure, the operation environment of the client and the record of the attribute re-evaluation are held as metadata common in an apparatus which has received the image from the client, and the attribute of the object is held as metadata of each object of a lower layer of the metadata common in the apparatus.

9. The apparatus according to claim 8, wherein the hierarchical structure of the metadata further includes metadata which is common in a job and is held in a lower layer of the metadata common in the apparatus which has received the image from the client, and metadata which is common in a page and is held in a lower layer of the metadata common in the job, and the metadata stored for each object is held as a lower layer of the metadata common in the page.

10. The apparatus according to claim 1, wherein the image processing apparatus is an image forming apparatus, and the image processing is print processing in which PDL data representing an image is received, converted into intermediate data, and stored, the intermediate data is rendered to generate bitmap data, and the bitmap data is printed.

11. An image processing apparatus comprising:
    a reception unit constructed to receive a first image from a client;
    a determination unit constructed to determine whether an operation environment of the client when a previously received second image different from the first image was received is identical to an operation environment of the client when the first image is received; and
    an execution unit constructed to execute re-evaluation of an attribute of an object included in the received first image in a case where the determination unit determines that the operation environment of the client when the second image was received is identical to the operation environment of the client when the first image is received, and there is information indicating that an attribute of an object included in the second image has been re-evaluated.

12. The apparatus according to claim 11, wherein in the attribute re-evaluation by said execution unit, character recognition is performed for an object that is a target of re-evaluation and metadata of the object is updated using an attribute obtained by re-evaluation.

13. An image processing method comprising the steps of:
    receiving from a client, an image and an object included in the image;
    storing an operation environment of the client as metadata of the object included in the image;
    evaluating an attribute of the object received in the receiving step;
    making as metadata a record indicating that the attribute has been re-evaluated, when an instruction is input to re-evaluate the attribute of the object which has undergone attribute evaluation in the evaluating step; and
    executing re-evaluation of an attribute of a received other image, upon receiving another image different from the image, when an operation environment of a client which has instructed to perform image processing of the other image is identical to the operation environment of the client which is stored in the storing step, and the record is made in the making step indicating that the attribute has been re-evaluated.

14. The method according to claim 13, further comprising the steps of:
    instructing to display a window which allows to instruct attribute re-evaluation of the object; and updating the attribute of the object based on a result of attribute re-evaluation.

15. The method according to claim 14, wherein the display instructing step comprises the steps of:
selecting several of objects included in a job based on a size of each object and the number of edges of each object; and
generating a screen on which display is performed to enable to select an object from the selected objects.

16. An image processing method comprising controlling at least one processor to perform the steps of:
receiving a first image from a client;
determining whether an operation environment of the client when a previously received second image different from the first image was received is identical to an operation environment of the client when the first image is received; and
executing re-evaluation of an attribute of an object included in the received first image, in a case where it is determined that the operation environment of the client when the second image was received is identical to the operation environment of the client when the first image is received, and there is information indicating that an attribute of an object included in the second image has been re-evaluated.

17. A non-transitory computer-readable storage medium storing a program which causes a computer to execute the steps of an image processing method of claim 13.

18. A non-transitory computer-readable storage medium storing a program which causes a computer to execute the steps of an image processing method of claim 16.

19. An image processing apparatus comprising:
a reception unit constructed to receive a first image from a client;
a determination unit constructed to determine whether an application of the client when a previously received second image different from the first image was received is identical to an application of the client when the first image is received; and
an execution unit constructed to execute re-evaluation of an attribute of an object included in the received first image in a case where the determination unit determines that the application of the client when the second image was received is identical to the application of the client when the first image is received, and there is information indicating that an attribute of an object included in the second image has been re-evaluated.

20. The apparatus according to claim 19, wherein in the attribute re-evaluation by said execution unit, character recognition is performed for an object that is a target of re-evaluation and metadata of the object is updated using an attribute obtained by re-evaluation.

* * * * *